(12) United States Patent
Reiner et al.

(10) Patent No.: US 10,289,633 B1
(45) Date of Patent: May 14, 2019

(54) INTEGRATING COMPLIANCE AND ANALYTIC ENVIRONMENTS THROUGH DATA LAKE CROSS CURRENTS

(71) Applicant: EMC Corporation, Hopkinton, MA (US)

(72) Inventors: David Stephen Reiner, Lexington, MA (US); Nihar Nanda, Acton, MA (US); Ron Tozzie, Pittsburgh, PA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 386 days.

(21) Appl. No.: 14/614,011

(22) Filed: Feb. 4, 2015

(51) Int. Cl.
G06F 16/28 (2019.01)
H04L 29/08 (2006.01)

(52) U.S. Cl.
CPC ............ *G06F 16/283* (2019.01); *H04L 67/10* (2013.01)

(58) Field of Classification Search
CPC .................................................. G06F 16/283
USPC ......................................................... 707/600
See application file for complete search history.

(56) References Cited

U.S. PATENT DOCUMENTS 7,747,480 B1 * 6/2010 Agresta .................. G06Q 10/06
                                                          700/1
7,788,213 B2 * 8/2010 Friedlander ........... G06F 19/322
                                                          707/600

8,838,556 B1    9/2014 Reiner et al.
2005/0193043 A1 * 9/2005 Hoover ................. G06F 19/328
                                                          707/204
2008/0288889 A1 * 11/2008 Hunt ...................... G06Q 30/02
                                                          715/810

(Continued)

FOREIGN PATENT DOCUMENTS

WO        2011130128 A1    10/2011

OTHER PUBLICATIONS

Philip Russom, Active Data Archiving for Big Data, Compliance, and Analytics, 2014, RainStor, p. 2-6.*

(Continued)

*Primary Examiner* — Pierre M Vital
*Assistant Examiner* — Andrew N Ho
(74) *Attorney, Agent, or Firm* — Ryan, Mason & Lewis, LLP

(57) ABSTRACT

An apparatus comprises a processing platform configured for integration of compliance and analytic environments. The compliance and analytic environments are implemented at least in part by the processing platform. The processing platform comprises at least a portion of a data lake at least partially shared between the compliance and analytic environments. The processing platform further comprises one or more integration mechanisms supporting interaction between the compliance and analytic environments via the data lake. Such integration mechanisms may include one or more of providing direct access from the analytic environment to the compliance environment, unified indexing across the compliance and analytics environments, tracking data set interrelationships across the compliance and analytic environments, associating event data of the compliance environment with enterprise activity data, movement of indexing artifacts, movement of contextual data, independent scaling of the compliance and analytic environments, and rehosting of data ingestion from the compliance environment to the analytic environment.

18 Claims, 4 Drawing Sheets

(56) References Cited

U.S. PATENT DOCUMENTS

| | | | | |
|---|---|---|---|---|
| 2009/0248619 | A1* | 10/2009 | Das | G06F 17/30545 707/2 |
| 2011/0066457 | A1* | 3/2011 | Chang | G06Q 10/10 707/600 |
| 2011/0066590 | A1* | 3/2011 | Chang | G06Q 40/06 707/602 |
| 2012/0136806 | A1* | 5/2012 | Anderson | G06F 17/30554 705/36 R |
| 2012/0173475 | A1* | 7/2012 | Ash | G06F 17/30563 707/600 |
| 2014/0258250 | A1 | 9/2014 | Ge et al. | |
| 2014/0304003 | A1* | 10/2014 | Sethumadhavan | G06F 19/327 705/3 |
| 2015/0356094 | A1* | 12/2015 | Gorelik | G06F 16/16 707/748 |
| 2015/0356123 | A1* | 12/2015 | Gorelik | G06F 17/30297 715/765 |

OTHER PUBLICATIONS

Booz Allen Hamilton, Data Lake-based Approaches to Regulatory—Driven Technology Challenges, 2014, Booz Allen, p. 3-4.*

Mike Ferguson, Architecting A Big Data Platform for Analytics, 2012, IBM, p. 13, p. 19-20, p. 24, p. 26 (Year: 2012).*

Mike Ferguson, Architecting A Big Data Platform for Analytics, 2012, IBM, p. 11-13, 19-20, 24 and 26 (Year: 2012).* ey.com, "Forensic Data Analytics: Globally Integrated Compliance Review, Litigation Support and Investigative Services," http://www.ey.com/Publication/vwLUAssets/EY-Forensic-data-analytics/$FILE/EY-Forensic-data-analytics.pdf, 2013, 12 pages.

Philip Russom, "Active Data Archiving: For Big Data, Compliance, and Analytics," TDWI Research, TDWI Checklist Report, http://rainstor.com/2013_new/wp-content/uploads/2014/11/WP_TDWI_ChecklistReport_Rainstor_Active-Data-Archiving.pdf, May 2014, 8 pages.

Booz Allen Hamilton, "Data Lake-Based Approaches to Regulatory-Driven Technology Challenges: How a Data Lake Approach Improves Accuracy and Cost Effectiveness in the Extract, Transform, and Load Process for Business and Regulatory Purposes," http://www.boozallen.com/content/dam/boozallen/media/file/data-lake-based-approaches-to-regulatory-driven-tech-changes.pdf, Apr. 2013, 6 pages.

Mike Ferguson, "Architecting a Big Data Platform for Analytics," White Paper, Intelligent Business Strategies, Oct. 2012, 36 pages.

Joe Nicholson, "Beyond BI: Big Data Analytic Use Cases," Datameer, Aug. 22, 2013, 7 pages.

U.S. Appl. No. 14/487,520 filed in the name of Nihar Nanda et al. Sep. 16, 2014 and entitled "Data Set Virtual Neighborhood Characterization, Provisioning and Access."

* cited by examiner

INTEGRATING COMPLIANCE AND ANALYTIC ENVIRONMENTS THROUGH DATA LAKE CROSS CURRENTS

FIELD

The field relates generally to information processing systems, and more particularly to techniques for implementing particular types of processing environments in information processing systems.

BACKGROUND

Information processing systems deployed in corporations, organizations and other enterprises often include functionality for facilitating compliance with various laws, regulations and policies that are relevant to those enterprises. Such compliance functionality arrangements are typically implemented in the form of respective compliance environments which are configured to support one or more application programs relating to designated compliance functions. Unfortunately, conventional compliance environments are often implemented in a manner that hinders their integration with other types of processing environments, as well as their effectiveness and scalability.

DETAILED DESCRIPTION

Illustrative embodiments of the present invention will be described herein with reference to exemplary information processing systems and associated processing platforms each comprising one or more processing devices. It is to be appreciated, however, that the invention is not restricted to use with the particular illustrative system, platform and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

It is to be appreciated that illustrative embodiments of the invention can include, without limitation, apparatus, systems, methods, and articles of manufacture comprising processor-readable storage media.

Figure 1:
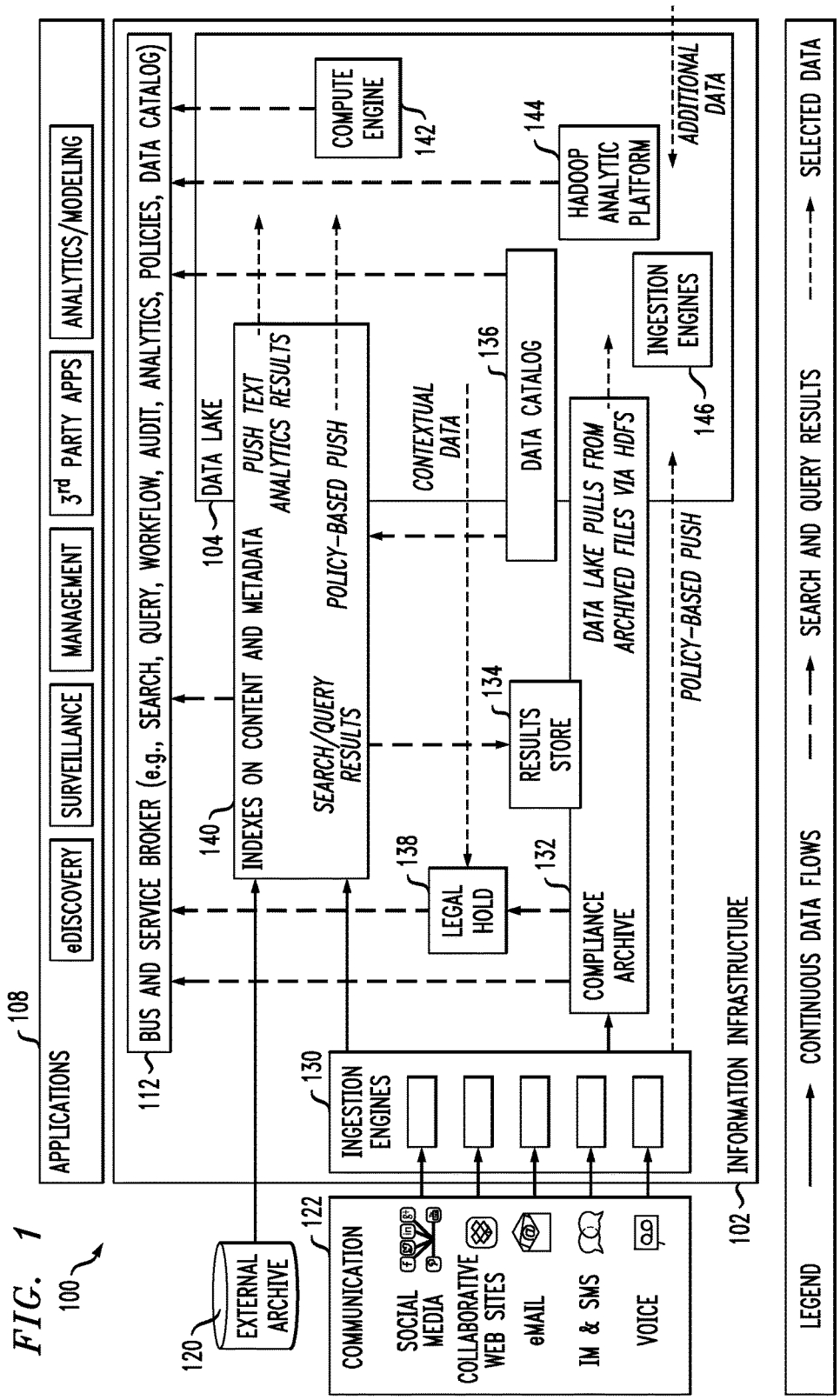
FIG. 1 is a block diagram of an information processing system in which compliance and analytic environments are integrated through data lake cross currents in an illustrative embodiment.

FIG. 1 shows an information processing system 100 configured in accordance with an illustrative embodiment of the present invention. The information processing system 100 is assumed to be built on at least one processing platform and provides functionality for integration of a compliance environment and an analytic environment through what are referred to herein as "data lake cross currents." Such data lake cross currents may be viewed as examples of what are more generally referred to herein as "integration mechanisms" that support interaction between the compliance environment and the analytic environment via at least a portion of at least one data lake.

By way of example, data lake cross currents or other integration mechanisms can illustratively include one or more of providing direct access from the analytic environment to the compliance environment, unified indexing across the compliance and analytics environments, tracking data set interrelationships across the compliance and analytic environments, associating event data of the compliance environment with enterprise activity data, movement of indexing artifacts, movement of contextual data, independent scaling of the compliance and analytic environments, and rehosting of data ingestion from the compliance environment to the analytic environment. A given embodiment can include multiple ones of these or other integration mechanisms that support interaction between a compliance environment and an analytic environment via at least one data lake.

The term "data lake" as utilized herein is intended to be broadly construed so as to encompass, for example, a data repository that stores data without optimization for particular predetermined types of analysis or other processing. For example, a data lake can be configured to store data in a manner that facilitates flexible and efficient utilization of the stored data to support processing tasks that may be at least partially unknown or otherwise undefined at the time of data storage. This is in contrast to so-called data warehouses or data marts, which generally store data in accordance with particular predefined sets of data attributes. Moreover, a data lake in some embodiments can provide the ability to deal with flexible combinations of a wide variety of different types of data.

Embodiments of the invention can be adapted for utilization in a wide variety of different information processing contexts, including financial services, telecommunications, health care, life sciences, and other verticals characterized by the need for both compliance and analytic capabilities.

The information processing system 100 in the present embodiment illustratively comprises at least portions of a compliance environment and an analytic environment.

By way of example, compliance environments in some embodiments have relatively stringent requirements about archiving data and guaranteeing its immutability, locating and separately holding all data that meets complex conditions, recognizing potential malfeasance or prohibited behavior in combinations of human communications and events, retaining indefinitely a record of historical searches and results, and deleting data only when mandated retention periods and other conditions have been satisfied.

Also by way of example, analytic environments in some embodiments are configured to discover patterns, correlations, and actionable insights from heterogeneous data sets of structured and unstructured data. Analytic goals may include developing models to recognize significant events and situations, to predict human behavior and responses, to visualize patterns in data, and to classify and segment customers, employees, actions, and other entities.

Furthermore, analytic environments in some embodiments are configured with fluid and ever-changing combinations of new and historical data sets provisioned from multiple sources, data set extracts and transformed copies of data sets, and sandboxes for discovery, analysis, and model construction.

The data lake 104 in the FIG. 1 embodiment illustratively comprises a time-variant aggregation of a large amount of raw and transformed data used for analytic purposes in an analytic environment. Numerous other types and configurations of data lakes can be used in other embodiments.

The separate nature of compliance and analytics environments in typical conventional practice can lead to a number of significant problems and other difficulties. For example, the formality and stringent requirements of compliance environments often contrast to the informality and fluidity of analytic environments. In financial services, telecommunications, health care, life sciences, and other verticals, compliance and analytic data sets are typically not synchronized or viewed holistically. Separate environments for compliance and analytics can be characterized by multiple copies of similar data, isolated data ("data silos"), disparate data types, little synchronization of data, no unified view of the content and metadata associated with federated data sets, and limited tracking or exploitation of data set interrelationships.

Data scientists and business analysts typically work with data sets that are associated with just one or the other of these two environments. This results in incomplete data discovery and weaker predictive and segmentation models.

Embodiments of the invention overcome these and other drawbacks of conventional arrangements by integrating compliance and analytics environments through data lake cross currents or other integration mechanisms. This approach brings the two environments together to solve one or more of the problems and difficulties mentioned above. In a given embodiment, for example, integrated compliance and analytic environments can facilitate data discovery, search, modeling, and business processes.

In some embodiments, analytic environments are configured to leverage compliance data sets made accessible via data lake cross currents in building, training and testing analytic models. These models can be evaluated as they are applied to applications such as electronic discovery ("eDiscovery"), surveillance and supervision, and risk management in compliance environments. Such a process leads to improved data discovery, stronger models, and quicker reaction times to events.

These and other embodiments also allow additional enterprise processes, such as customer relationship management, to benefit from access to historical communications and events maintained for compliance. For example, some embodiments of the invention allow customer relationship management, partner management, and other enterprise applications and activities not directly related to compliance to leverage access to the historical human communications and events that have been retained for compliance purposes. This significantly increases the number and value of opportunities available to the enterprise.

In the FIG. 1 embodiment, the information processing system 100 comprises information infrastructure 102 which illustratively includes one or more processing platforms or portions thereof. The information infrastructure 102 in this embodiment implements a data lake 104 and a set of applications 108. The set of applications 108 more particularly comprises a plurality of specific applications which illustratively include, among others, eDiscovery applications and surveillance applications.

A given one of the eDiscovery applications is illustratively configured to facilitate conformance to regulatory or legal demands, such as a request to produce documents related to communications among brokers about a stock during a given time period. Such an application can be utilized to implement one or more processes relating to legal holds for certain data within the system 100.

A given one of the surveillance applications is illustratively configured to facilitate conformance to business processes, such as those governing communications to customers about investment choices and volatility of outcomes.

Other applications in the set of applications 108 include management applications, third party applications, and analytics/modeling applications, where the "I" notation herein should be understood as referring to "and/or" unless otherwise indicated.

It is to be appreciated that these particular applications are examples only, and a wide variety of other applications can be used.

Although shown as separate from the information infrastructure 102 in this embodiment, the set of applications 108 in other embodiments is implemented at least in part within the information infrastructure 102. For example, one or more of the applications 108 can be viewed as running on the same processing platform that also provides at least a portion of the information infrastructure 102.

Also, the set of applications 108 in other embodiments may include or be otherwise associated with one or more additional elements. For example, in some embodiments, the set of applications 108 can further comprise or be otherwise associated with a common application graphical user interface (GUI) and visualization layer which supports user access to at least a subset of the applications 108.

The set of applications 108 interfaces to the information infrastructure 102 via a bus and service broker component 112. The bus portion of component 112 illustratively comprises a publish-subscribe bus, although other types of buses can be used. The service broker portion of component 112 can be configured to enable access to services such as search, query, workflow, audit, analytics, policies and data catalog. Access to additional or alternative services can be provided via the service broker portion of component 112, including, for example, data management services.

The information infrastructure 102 is coupled to at least one external archive 120 as well as multiple communication data sources 122. The communication data sources illustratively include social media sources, collaborative web sites, email sources, instant message (IM) and short message service (SMS) sources, and voice sources. The voice sources may include, for example, Voice of the Customer (VoC) data compiled using NICE systems. Communication data can be provided to the information infrastructure 102 from numerous other types and arrangements of additional or alternative sources.

Data from each of the communication data sources 122 is captured by a corresponding one of a plurality of ingestion engines 130. It is also possible for at least a given one of the ingestion engines 130 to capture data from multiple sources of different types. One or more of the ingestion engines 130, or other ingestion engines referred to herein, could be implemented as real-time ingestion engines. Also, these and other ingestion engines are not limited to ingestion of communication data, but can more generally ingest additional or alternative types of data, including behavioral data and other types of event data. The term "event data" as used herein is intended to encompass communication data, behavioral data, and other types of data relating to one or more events involving system 100.

As noted above, system 100 in the present embodiment implements at least portions of a compliance environment and an analytic environment. The ingestion engines 130 are assumed to be part of the compliance environment. Other parts of the compliance environment in this embodiment include a compliance archive 132, a results store 134, a data catalog 136, a legal hold module 138, and an indexer 140. Certain ones of the applications 108 are also considered part of the compliance environment, including, for example, the eDiscovery and surveillance applications, and possibly one or more of the management applications and third party applications, as well as corresponding portions of the bus and service broker component 112.

The analytic environment in this embodiment illustratively comprises compute engine 142, Hadoop analytic platform 144 and ingestion engines 146. Certain ones of the applications 108 are also considered part of the analytic environment, including, for example, the analytics/modeling application, and possibly one or more of the management applications and third party applications, as well as corresponding portions of the bus and service broker component 112.

The compute engine 142 in some embodiments is implemented at least in part utilizing a product such as Pivotal HAWQ™. Numerous other types and arrangements of compute engines can additionally or alternatively be used in the system 100, including Apache Spark™ which provides a fast and general compute engine incorporating machine learning for large-scale data processing.

The Hadoop analytic platform 144 in some embodiments is implemented at least in part utilizing a product such as Pivotal HD™, a commercial distribution of Apache Hadoop, an open-source big data platform.

Accordingly, in a given implementation of system 100, models can be built rapidly by data scientists and business analysts using tools such as R and SAS, big data analytic platforms such as Pivotal HD™, ecosystems such as Hadoop, and computation engines and machine learning tools such as Pivotal HAWQ™ and Apache Spark™.

It is to be appreciated that the particular products noted above in the context of compute engine 142 and analytic platform 144 are examples only, and other types of products may be utilized to implement these components in other embodiments.

It should be noted that the analytic environment in the present embodiment includes components, such as compute engine 142, Hadoop analytic platform 144 and ingestion engines 146, that are illustratively shown as being implemented "within" the data lake 104. Such an illustration is intended to indicate that these components of the analytic environment in the FIG. 1 embodiment are implemented within a common "ecosystem" associated with the data lake 104, such as a Hadoop ecosystem. Such an ecosystem illustratively comprises at least one processing platform providing common processing functionality for use by the analytic environment components and the data lake 104.

Various storage elements of the system 100, such as data lake 104, external archive 120, compliance archive 132, results store 134 and data catalog 136 are illustratively implemented at least in part utilizing storage disks, storage arrays, electronic memories or other types of memory, in any combination.

At least portions of the data stored in the system 100 may be in the form of data sets. A "data set" as the term is broadly used herein may be viewed, for example, as an abstraction of one or more data items, such as a table, document, file, query result, set of key-value pairs, index, storage block contents, in-memory caches or other data item or combinations thereof, where the given data set is characterized by properties as well as relationships to other data sets. These properties and relationships are captured by metadata that is associated with the data set in the system 100. For example, metadata can be used to describe data set characteristics such as ownership, type, content, schema, classification, matchable patterns, text analytics characterizations, security classifications, provenance, usability, quality, ad hoc user tags, and many others.

Additional details regarding exemplary data sets and metadata characterizing those data sets, as well as techniques for reasoning over such metadata, can be found in U.S. Pat. No. 8,838,556, entitled "Managing Data Sets by Reasoning over Captured Metadata," U.S. patent application Ser. No. 14/487,520, filed Sep. 16, 2014 and entitled "Data Set Virtual Neighborhood Characterization, Provisioning and Access," and U.S. patent application Ser. No. 13/538, 219, filed Jun. 29, 2012 and entitled "Dynamic Information Assembly for Designated Purpose based on Suitability Reasoning over Metadata," all of which are commonly assigned herewith and incorporated by reference herein.

As noted above, the information processing system 100 is configured to incorporate one or more integration mechanisms supporting interaction between the compliance environment and the analytic environment via the data lake 104. These integration mechanisms utilize various types of movement of data into and out of the data lake 104, as well as other types of data movement as indicated in the figure legend, including continuous data flows, search and query results and selected data. These and other types of data movement involving the data lake 104 may be viewed as examples of data lake "cross currents" associated with integration of the compliance and analytics environments.

Examples of continuous data flows in this embodiment include flows from the communication data sources 122 into the ingestion engines 130, flows from the ingestion engines 130 into the indexer 140, flows from the ingestion engines 130 into the compliance archive 132, and flows from the external archive 120 into the indexer 140.

Examples of movement of search and query results in this embodiment include movement from the indexer 140 to the results store 134, movement from the data catalog 136 to the indexer 140, and movement from each of elements 132, 136, 138, 140, 142 and 144 into the bus and service broker component 112.

Examples of movement of selected data in this embodiment include policy-based push of communication data, behavioral data, or other event data from one or more of the ingestion engines 130 of the compliance environment to the data lake 104 for use by the analytic environment, and policy-based push of indexes, metadata, or other related information from the indexer 140 to the data lake 104 for use by the analytics environment. The latter pushing of related information may further comprise, for example, pushing of text analytics results to the data lake 104. Other types of policy-based data movement can be used.

It should be noted in this regard that the term "policy" is intended to be broadly construed, and therefore encompasses a wide range of possible arrangements, including business policies and other arrangements of one or more rules used to control movement of data or other system functionality.

Accordingly, policies can also be applied in a variety of other ways in the system 100. For example, the service broker portion of component 112 can be configured to offer policy-based security enforcement providing data protection at the time of data access. This may involve tagging one or more data sets with security classifications for use in implementation of the policy-based security enforcement.

Another selected data movement provided in the system 100 involves the data lake 104 pulling archived files of the compliance archive 132 via the Hadoop Distributed File System (HDFS).

In addition, the system 100 is configured to provide selected data movement in the form of pushing or pulling of contextual data from the data lake 104 to the compliance environment, and more particularly from the data lake 104 to the legal hold module 138 of the compliance environment. The legal hold module 138 is an example of a special-case data store implemented within the system 100. Other types of special-case data stores can be implemented in other embodiments.

Yet another selected data movement provided in the system 100 is an ability for the data lake 104 to obtain additional data from external sources not explicitly illustrated in the figure. Such additional data stored in the data lake 104 can be utilized by both the compliance environment and the analytic environment.

The references above and elsewhere herein to "pushing" or "pulling" of data should be viewed as examples only. In other embodiments, data described as being obtained via push mechanisms in the FIG. 1 embodiment can instead be obtained via pull mechanisms, and vice versa. Terms such as "obtaining data" or "moving data" as used herein should be understood to encompass a wide variety of mechanisms for accessing data, including both push and pull mechanisms.

It is to be appreciated that the particular arrangement of system components illustrated in FIG. 1 is exemplary only, and that numerous other arrangements of components may be used in other embodiments. For example, in other embodiments, functionality described herein as being associated with particular components of the system 100 may be implemented at least in part using additional or alternative components of the system 100. One possible alternative arrangement of system components will be described in greater detail below in conjunction with FIG. 3, although many other alternative arrangements will be apparent to those skilled in the art given the teachings provided herein.

As mentioned previously, the information infrastructure 102 including data lake 104 and various components of the compliance and analytic environments is assumed in the present embodiment to be implemented on a given processing platform using at least one processing device comprising a processor coupled to a memory.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. These and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing electronic memory. The term "article of manufacture" as used herein should be understood to exclude transitory, propagating signals.

The one or more processing devices implementing at least portions of the information infrastructure 102, and possibly other components of system 100, may each further include a network interface that allows such components to communicate with one another over one or more networks. Such network interface circuitry may comprise, for example, one or more conventional transceivers.

The above-noted network may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

At least a subset of the components of the compliance and analytic environments, and possibly other system components, may comprise software that is stored in a memory and executed by a processor of at least one processing device.

Processing devices comprising processors, memories and network interfaces as described above are illustratively part of a processing platform comprising physical and virtual resources in any combination. Additional examples of such processing platforms that may be used to implement at least portions of the system 100 will be described in more detail below in conjunction with FIGS. 4 and 5.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations. Moreover, the particular types of data movement involving continuous data flows, search and query results and selected data in the FIG. 1 embodiment are illustrative only, and can be varied in other embodiments.

The operation of the information processing system 100 will now be further described with reference to the flow diagram of FIG. 2, which illustrates an exemplary process carried out by the system 100 in one embodiment. The process as shown includes steps 200, 202 and 204. However, it should be noted that functionality for integration of compliance and analytic environments through data lake cross currents should not be viewed as limited in any way to this particular arrangement of process steps.

In step 200, at least portions of a compliance environment and an analytic environment are provided using at least one processing platform of the system 100.

In step 202, at least a portion of a data lake at least partially shared between the compliance environment and the analytic environment is provided using at least one processing platform of the system 100. This could be the same or a different platform or set of platforms than that used to implement at least portions of the compliance and analytic environments in step 200. Accordingly, it is to be appreciated that various arrangements of one or more processing platforms can be used in implementing the compliance and analytic environments and the data lake 104 in the system 100.

In step 204, one or more integration mechanisms supporting interaction between the compliance environment and the analytic environment via the data lake are implemented.

Figure 2:
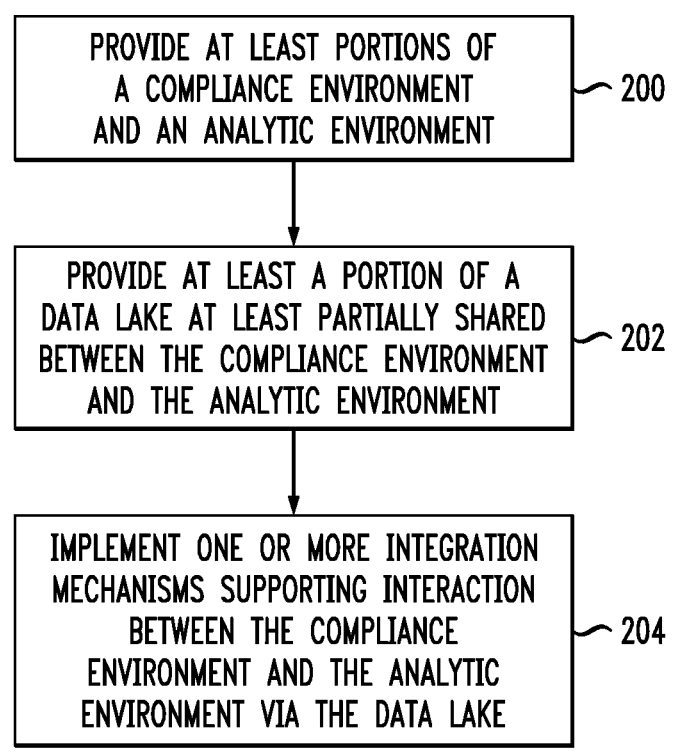
FIG. 2 is a flow diagram of an exemplary process implemented in the information processing system of FIG. 1.

As mentioned previously, examples of data lake cross currents or other integration mechanisms suitable for implementation in step 204 of the FIG. 2 process include one or more of providing direct access from the analytic environment to the compliance environment, unified indexing across the compliance and analytics environments, tracking data set interrelationships across the compliance and analytic environments, associating event data of the compliance environment with enterprise activity data, movement of indexing artifacts, movement of contextual data, independent scaling of the compliance and analytic environments, and rehosting of data ingestion from the compliance environment to the analytic environment. A given embodiment can include multiple ones of these or other integration mechanisms that support interaction between a compliance environment and an analytic environment via at least one data lake. Such integration mechanisms will now be described in greater detail with reference again to the system 100 of FIG. 1. It is assumed for purposes of the following description that the system 100 implements each of these integration mechanisms, although other embodiments can implement different subsets of these integration mechanisms, and possibly additional or alternative integration mechanisms.

A given one of the integration mechanisms referred to above provides direct access from the analytic environment to compliance data in the compliance archive 132 of the compliance environment. As a more particular example, this direct access may comprise pull functionality configured to permit the data lake 104 to pull archived files from the compliance archive 132 of the compliance environment. This is illustrated in FIG. 1 as a type of movement of selected data, illustratively utilizing HDFS. A direct access integration mechanism allows modelers working in the analytic environment to have substantial access to current compliance data sets that can improve model construction, training, and testing. Such direct access can be provided subject to appropriate access controls.

Another exemplary integration mechanism implemented in the FIG. 1 embodiment provides a unified indexing capability across the compliance and analytic environments via the data lake 104. Implementation of this integration mechanism may involve, for example, configuring indexer 140 as a unified indexer that permits integrated searching over data from the compliance archive 132 of the compliance environment, data from one or more external archives, such as external archive 120, that are not part of the compliance environment, and additional data in the data lake 104. The unified indexer is illustratively configured to generate indexes over both content and metadata. Such a unified indexing capability illustratively facilitates searches across multiple internal and external archives as well as the additional data in the data lake 104. It covers cases in which data cannot be extracted from an external archive but can be indexed to support cross-source searches.

A further integration mechanism implemented in the FIG. 1 embodiment provides tracking of data set interrelationships across the compliance and analytic environments. Tracking of data set interrelationships across the two environments improves the analytic process. This leads to improved understanding of dependencies, copies, extracts, filters, and processing transformations among data sets, which in turn facilitates data set choices for analytic purposes. This integration mechanism can make use of the techniques disclosed in the above-cited U.S. Pat. No. 8,838, 556 and U.S. patent application Ser. Nos. 14/487,520 and 13/538,219. Tracking of data set interrelationships in some embodiments may involve, for example, tracking data set metadata, provenance and transformations.

Yet another integration mechanism provided in the FIG. 1 embodiment associates communication data, behavioral data, or other event data retained in the compliance archive 132 of the compliance environment with enterprise activity data stored in the data lake 104 for enhancing modeling functionality of the analytic environment. For example, model building in the related areas of customer relationship management, partner management, and other enterprise activities can be performed better through access to a combination of historical human communications and events, retained for compliance purposes, with contextual data from the data lake 104 about people, business transactions, external events, and extracted entities and relationships and sentiments associated with human communications. Such an arrangement, for example, enables data scientists and business analysts to test and train more powerful analytic models.

The term "contextual data" as used herein is intended to be broadly construed, so as to encompass, for example, various types of corroborating data, ancillary data and behavioral data. As a more particular example, contextual data in some embodiments may comprise contextual data associated with one or more of business process operational metrics, organizational and external relationships, compliance metrics, business execution data and data indicative of enterprise operational risk. Numerous other types of contextual data can be utilized in other embodiments. It should be noted in this regard that certain types of event data may also be considered contextual data as the latter term is used herein. For example, a given item of behavioral data may comprise event data and yet also be considered contextual data. Accordingly, certain of the various types of data movement referred to herein can relate to event data, contextual data or both, as well as to other types of data.

The FIG. 1 embodiment also includes an integration mechanism providing periodic export of indexing artifacts related to compliance data to the analytic environment. For example, periodic export of indexing artifacts related to compliance data to the analytic environment facilitates the building of more powerful analytic models. Such artifacts can include various types of information associated with one or more indexes, including, for example, tags, structures, classifications, annotations, facets, dimensions and counts. The corresponding indexes may comprise content indexes, metadata indexes, join indexes and other types of indexes. The indexing artifacts in some embodiments comprise text analytics (including sentiment analysis) produced during the indexing process. This provides the ability for analytic users to understand complex data patterns using simple specifications.

Another integration mechanism implemented in the FIG. 1 embodiment provides movement of corroborating data, ancillary data, behavioral data, or other types of contextual data associated with one or more transactions from the analytic environment to the compliance environment. As illustrated in FIG. 1 this contextual data illustratively includes contextual data provided from the data lake 104 to the legal hold module 138 via selective data movement. For example, when communications between two financial brokers are put on legal hold, the transactions they executed in the hours following the communications can also be associated with the legal hold. Numerous other types of contextual data from the analytic environment can move to or be copied to the compliance environment when identified.

A further integration mechanism provided in the FIG. 1 embodiment permits scaling of at least one of the compliance and analytic environments so as to facilitate coordinated handling of combined workloads including one or more of ingestion, archiving, search, surveillance, and model development and scoring. Data and metadata cross currents between the two environments represent a loose coupling that allows independent scaling of these environments to handle the combined workloads. This enables financial analysts to build and test models more rapidly, with additional iterations (e.g., through genetic algorithms) that improve model quality.

An additional integration mechanism provided in the FIG. 1 embodiment permits rehosting of at least a portion of ingestion functionality of one or more of the ingestion engines 130 of the compliance environment on one or more of the ingestion engines 146 of the analytic environment. Given the data lake cross currents between the two environments, it becomes much more feasible to move ingestion processing directly into the analytic environment over time. This aids scalability and can leverage powerful machine learning tools directly that are often found in analytic environments (e.g., Pivotal HAWQ™ and Apache Spark™).

Another integration mechanism implemented in the FIG. 1 embodiment provides one or more workflows for the compliance environment based at least in part on one or more models that are generated by the analytic environment utilizing compliance data obtained from the compliance environment via the data lake 104. Cross currents between the analytic and compliance environments create new self-learning and new organizational learning assets in the form of machine and human workflows and processes. For example, data and metadata supporting the detection of non-compliant behaviors, such as money-laundering, can be modeled so to define process improvements and new compliant behaviors. As a more particular example, accelerated fraud detection can be provided, using analytic collaboration among financial agencies and regulators to enable faster tracking of fraud involving complex global transactions across multiple financial institutions. The ability to provide collaborative data and applications based on policy enables process efficiency.

The particular processing operations, integration mechanisms and other system functionality described in conjunction with the flow diagram of FIG. 2 are presented by way of illustrative example only, and should not be construed as limiting the scope of the invention in any way. Alternative embodiments can use other types of processing operations for integrating compliance and analytic environments via data lake cross currents or other integration mechanisms. For example, the ordering of the process steps may be varied in other embodiments, or certain steps may be performed concurrently with one another rather than serially. Also, various distinct arrangements of the above-described integration mechanisms, and possibly additional or alternative integration mechanisms, can be provided in a given embodiment. For example, another possible integration mechanism that may be deployed in a given embodiment is data harmonization modeling.

It is to be appreciated that functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

A number of examples setting forth various features of particular implementations of the system 100 will now be described. These examples relate to use cases that are enabled, improved, or greatly facilitated through the utilization of data lake cross currents to integrate compliance and analytic environments as disclosed herein. Although these examples are drawn primarily from the financial services vertical, additional or alternative features can be provided in other verticals where compliance and analytics can be beneficial, including telecommunications, health care, life sciences, and numerous others.

In a first example, eDiscovery functionality is implemented in the system 100 using the compliance and analytic environments integrated through data lake cross currents or other integration mechanisms. This eDiscovery functionality includes one or more of the following elements:

1. Locate, preserve and deliver evidence relating to legal matters.

2. Develop and apply models for early case assessment (e.g., statistically representative sampling).

3. Develop and apply models for data filtering (e.g., technology assisted review, predictive coding, concept searching, clustering).

4. Improve timeliness of response to eDiscovery requests through forensic examination of historical cases.

5. Identify archived documents or other material for defensible disposition.

6. Move and remediate existing compliance archive (e.g., remove duplicates and data with no legal risk or business value, or otherwise appropriate for defensible disposition).

7. Develop new legal user tools to improve or accelerate eDiscovery processes.

8. Discover links among archived data to support and enable outbound litigation.

In a second example, surveillance, supervision and compliance functionality is implemented in the system 100 using the compliance and analytic environments integrated through data lake cross currents or other integration mechanisms. This surveillance, supervision and compliance functionality includes one or more of the following elements:

1. Supervise employees and partners to detect prohibited or potentially harmful contacts and activities.

2. Segment employees for intensified supervision based on factors that include communication behavior.

3. Uncover past financial crimes (e.g., money laundering, price fixing, anomalies and harmful behavior).

4. Collaboratively discover financial crimes among regulators and other institutes with proper governance and controls.

5. Discover past fraud attempts (as distinguished from normal activity).

6. Satisfy regulator's requests for specified data, logs, and evidence of process compliance.

7. Improve communication tagging and metadata through text analytics or other specialized analytics.

8. Detect and prevent ongoing fraud and financial crimes (increasingly near-real-time).

9. Detect and prevent ongoing regulatory and policy violations (increasingly near-real-time).

10. Respond rapidly to new or modified regulations for surveillance capabilities.

In a third example, business risk management functionality is implemented in the system 100 using the compliance and analytic environments integrated through data lake cross currents or other integration mechanisms. It should be noted in this regard that business risks, such as liquidity risk, are different from information technology risks, such as data loss. The business risk management functionality in this example includes one or more of the following elements:

1. Evaluate customer-side risk based on portfolios and past behavior (e.g., communications).

2. Identify under-managed or inadequately-overseen areas of the business based on communications.

3. Gauge overall credit and market risk based on factors that include communication behavior.

4. Respond to new or modified regulations for risk recognition and mitigation.

In a fourth example, customer relationship management functionality is implemented in the system 100 using the compliance and analytic environments integrated through data lake cross currents or other integration mechanisms. Such customer relationship management functionality is more particularly facilitated in some embodiments by the combination of the compliance data sets with the data lake 104, the data lake ecosystem (e.g., Hadoop), and external analytic tools. The customer relationship management functionality in this example includes one or more of the following elements:

1. Segment customers for sales and marketing based on factors that include communication behavior.

2. Attract new customers.

3. Increase customer engagement.

4. Increase customer loyalty.

5. Decrease customer attrition.

6. Detect cross-sell and up-sell opportunities.

7. Assign customer value based on factors that include communication behavior.

8. Improve public face via social media sentiment analysis (e.g., with respect to products, services, brands, policies, procedures).

Again, the above examples and associated functionality should not be viewed as limiting in any way. Numerous other embodiments utilizing compliance and analytic environments integrated through data lake cross currents will be apparent to those skilled in the art given the teachings provided herein. For example, other embodiments can be configured in which compliance and analytic environments integrated via data lake cross currents are utilized to improve a wide variety of general business processes of an enterprise. As another example, in one or more other embodiments, an information processing system with integrated compliance and analytic environments of the type disclosed herein can be utilized to facilitate implementation of features such as Business Analytics as a Service (BAaaS).

As noted above, the particular arrangement of components comprising system 100 as illustrated in FIG. 1 is presented by way of example only, and numerous alternative embodiments are possible.

Figure 3:
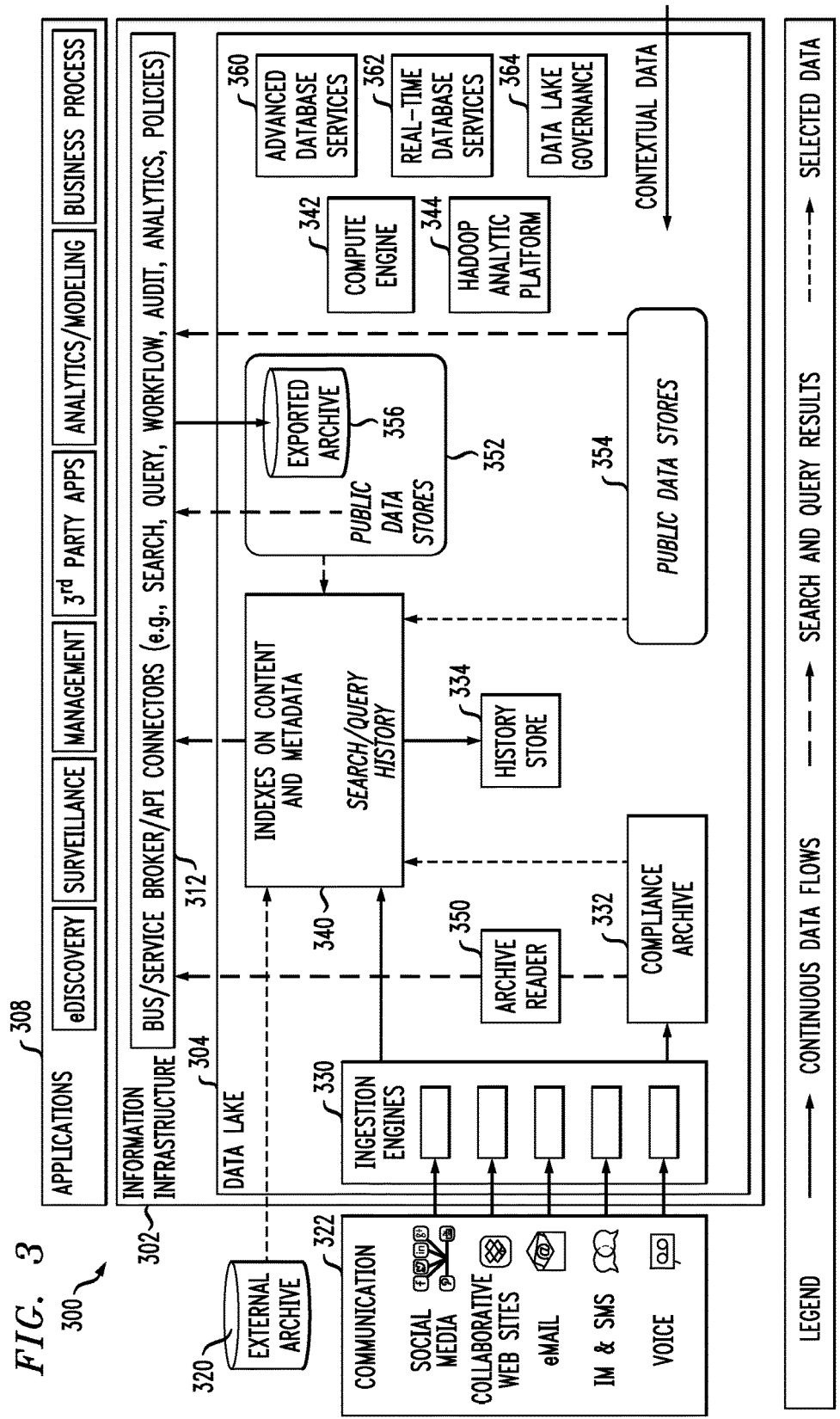
FIG. 3 is a block diagram of an information processing system in which compliance and analytic environments are integrated through data lake cross currents in another illustrative embodiment.

FIG. 3 shows an information processing system 300 in another illustrative embodiment. The system 300 comprises information infrastructure 302 that implements a data lake 304 using one or more processing platforms. The system 300 further comprises a set of applications 308, a bus and service broker component 312, an external archive 320, communication data sources 322, ingestion engines 330, compliance archive 332, store 334, unified indexer 340, compute engine 342 and Hadoop analytic platform 344. The components operate in a manner similar to respective corresponding components 108, 112, 120, 122, 130, 132, 134, 140, 142 and 144 previously described in conjunction with the FIG. 1 embodiment. The store 334 is more particularly implemented as a history store configured to store search/query history information generated by the unified indexer 340.

In the FIG. 3 embodiment, the data lake 304 encompasses additional system components beyond those illustratively encompassed by the data lake 104 of the FIG. 1 embodiment. For example, as shown in FIG. 3, components such as the ingestion engines 330, compliance archive 332, store 334 and unified indexer 340 overlap with, and are assumed to have direct accessibility to, the data lake 304. In addition, the data lake 304 further encompasses an archive reader 350, private data stores 352 and public data stores 354. The private data stores 352 in the present embodiment comprise at least one exported archive 356, although other embodiments can include private data stores without any exported archives.

The analytic environment in the system 300 includes, in addition to compute engine 342 and Hadoop analytic platform 344, advanced database services 360, real-time database services 362, and a data lake governance module 364. The advanced database services 360 and real-time database services 362 are illustratively implemented using Pivotal HAWQ™ and Pivotal GemFire XD™, respectively, although other products may be used.

The applications 308 in this embodiment include applications similar to those of the FIG. 1 embodiment, with the addition of one or more business process applications. Also, the bus and service broker component 312 further comprises application programming interface (API) connectors.

The data lake 304 receives contextual data relating to employees, customers, transactions and events from external sources not explicitly shown.

The FIG. 3 embodiment supports a variety of different types of data movement, including continuous data flows, data movement relating to search and query results, and selected data movement. As in the FIG. 1 embodiment, certain types of data movement involving the data lake 304 of FIG. 3 can be considered examples of data lake cross currents that are utilized in conjunction with integration of compliance and analytic environments of the system 300. Again, numerous additional or alternative types of data movement can be provided in order to facilitate such integration.

Also, one or more of the integration mechanisms previously described in conjunction with FIG. 2 can be similarly implemented in the FIG. 3 embodiment.

Illustrative embodiments such as information processing systems 100 and 300 of respective FIGS. 1 and 3 can be configured to provide a number of significant advantages relative to conventional arrangements.

For example, one or more of these embodiments avoid arrangements in which separate environments for compliance and analytics maintain multiple copies of similar but unsynchronized data. Instead, data set interrelationships across compliance and analytic environments are made apparent and utilized in processing, data movement, or data sharing.

Also, scalability is considerably improved in some embodiments, allowing efficient and flexible reconfiguration for variations in ingestion, archiving, and analytic workloads.

Additionally or alternatively, a holistic and unified view or search capability is made available for content and metadata associated with federated data sets, providing data scientists and business analysts with potential insights that can lead to more powerful models. The models developed in analytic environments potentially have full access to current compliance data sets that improve their construction, training, and testing, subject to appropriate access controls.

Where compliance data sets are present for modeling, then corroborating data, ancillary data, behavioral data, or other types of contextual data can be made available about the humans who are interacting and the business aspects of the interactions (e.g., current stock prices or foreign exchange spreads).

Furthermore, in some embodiments powerful analytic and machine learning capabilities are made accessible to the compliance environment where ingestion of communication data and other event data typically takes place.

Also, some embodiments are configured to support heterogeneous analytic workloads (e.g., statistical analysis, drill-down, machine-learning, pattern-matching, search and query) that can be used for compliance modeling with security, agility and scalability.

It is to be appreciated that the foregoing advantages are illustrative of advantages provided in certain embodiments, and need not be present in other embodiments.

It was noted above that portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention, including system 300 of FIG. 3.

Figure 4:
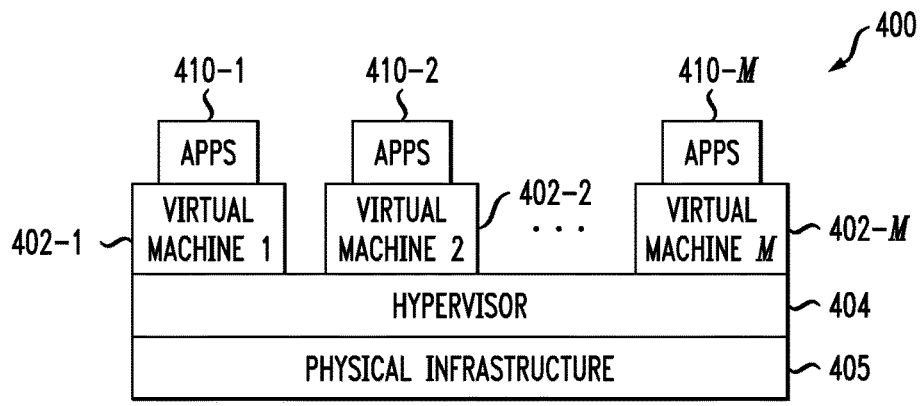
FIGS. 4 and 5 show examples of processing platforms that may be utilized to implement at least a portion of the information processing system of FIG. 1.
Figure 5:
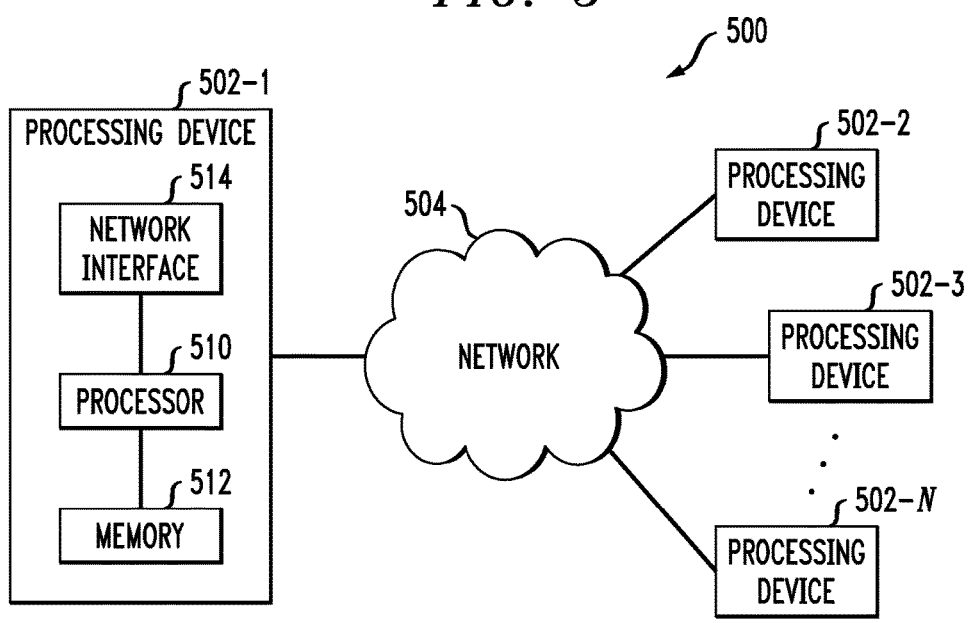

As shown in FIG. 4, portions of the information processing system 100 may comprise cloud infrastructure 400. The cloud infrastructure 400 comprises virtual machines (VMs) 402-1, 402-2, . . . 402-M implemented using a hypervisor 404. The hypervisor 404 runs on physical infrastructure 405. The cloud infrastructure 400 further comprises sets of applications 410-1, 410-2, . . . 410-M running on respective ones of the virtual machines 402-1, 402-2, . . . 402-M under the control of the hypervisor 404.

Although only a single hypervisor 404 is shown in the embodiment of FIG. 4, the system 100 may of course include multiple hypervisors each providing a set of virtual machines using at least one underlying physical machine. For example, different sets of virtual machines provided by respective ones of multiple hypervisors may be utilized in configuring multiple instances of various components of the system 100.

An example of a commercially available hypervisor platform that may be used to implement hypervisor 404 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass.

Additional or alternative storage products that can be used in implementing portions of system 100 include scale-out network attached storage (NAS) clusters. Such clusters may more particularly include, for example, Isilon® storage platforms, such as storage platforms comprising Isilon® platform nodes and associated accelerators in the S-Series, X-Series and NL-Series product lines, commercially available from EMC Corporation.

It is also possible that portions of system 100 can be implemented at least in part using converged infrastructure, such as Vblock® converged infrastructure commercially available from EMC Corporation.

One or more of the processing modules or other components of system 100 may therefore each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-N, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an ASIC, an FPGA, or other type of processing circuitry, as well as portions or combinations of such circuitry elements.

The memory 512 may comprise RAM, ROM or other types of memory, in any combination. As mentioned previously, the memory 512 and other memories disclosed herein should be viewed as illustrative examples of what are more generally referred to as "processor-readable storage media" storing executable program code of one or more software programs, and articles of manufacture comprising such processor-readable storage media are considered embodiments of the present invention.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media. Similar arrangements can be utilized in implementing system 300 of FIG. 3, as well as other types of information processing systems in other embodiments.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, and other components. In addition, the particular compliance and analytic environments, data lake configurations, integration mechanisms, modules, processing operations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
a processing platform implementing at least portions of a compliance environment and an analytic environment;
wherein the processing platform comprises:
at least a portion of a data lake at least partially shared between the compliance environment and the analytic environment; and
a plurality of integration mechanisms supporting interaction between the compliance environment and the analytic environment via the data lake;
wherein a first one of the integration mechanisms implements a unified indexing capability across the compliance and analytic environments;
wherein a second one of the integration mechanisms implements tracking of data set interrelationships across the compliance and analytic environments;
wherein the first integration mechanism comprises a unified indexer configured to generate indexes over both content and metadata, the unified indexer being further configured to permit integrated searching over data from:
(i) a compliance archive of the compliance environment;
(ii) an external archive that is not part of the compliance environment; and
(iii) additional data in the data lake, the additional data being obtained not from the compliance archive or the external archive but instead from one or more other sources that are external to the data lake;
wherein a third one of the integration mechanisms provides periodic export of indexing artifacts related to compliance data to the analytic environment; and
wherein the processing platform further comprises one or more processing devices each comprising a processor coupled to a memory.

2. The apparatus of claim 1 wherein a given one of the integration mechanisms provides direct access from the analytic environment to compliance data in a compliance archive of the compliance environment.

3. The apparatus of claim 2 wherein the given integration mechanism comprises functionality configured to permit the data lake to obtain archived files from the compliance archive of the compliance environment.

4. The apparatus of claim 1 wherein a given one of the integration mechanisms associates event data retained in a compliance archive of the compliance environment with enterprise activity data stored in the data lake for enhancing modeling functionality of the analytic environment.

5. The apparatus of claim 1 wherein a given one of the integration mechanisms provides movement of contextual data associated with one or more transactions from the analytic environment to the compliance environment.

6. The apparatus of claim 5 wherein said contextual data comprises contextual data associated with one or more of business process operational metrics, organizational and external relationships, compliance metrics, business execution data and data indicative of enterprise operational risk.

7. The apparatus of claim 1 wherein a given one of the integration mechanisms permits scaling of at least one of the compliance and analytic environments so as to facilitate coordinated handling of combined workloads including one or more of ingestion, archiving, search, electronic discovery, surveillance, and model development and scoring.

8. The apparatus of claim 1 wherein a given one of the integration mechanisms permits rehosting of at least a portion of ingestion functionality of one or more ingestion engines of the compliance environment on one or more ingestion engines of the analytic environment.

9. The apparatus of claim 1 wherein a given one of the integration mechanisms provides one or more workflows for the compliance environment based at least in part on one or more models generated by the analytic environment utilizing compliance data obtained from the compliance environment via the data lake.

10. The apparatus of claim 1 wherein the processing platform further comprises at least one of a bus and a service broker configured to interface each of a plurality of applications to at least one of the compliance and analytic environments.

11. An information processing system comprising the apparatus of claim 1.

12. A method comprising:
providing at least portions of a compliance environment and an analytic environment;
providing at least a portion of a data lake at least partially shared between the compliance environment and the analytic environment; and
implementing a plurality of integration mechanisms supporting interaction between the compliance environment and the analytic environment via the data lake;
wherein a first one of the integration mechanisms implements a unified indexing capability across the compliance and analytic environments;
wherein a second one of the integration mechanisms implements tracking of data set interrelationships across the compliance and analytic environments;
wherein the first integration mechanism comprises a unified indexer configured to generate indexes over both content and metadata, the unified indexer being further configured to permit integrated searching over data from:
(i) a compliance archive of the compliance environment;
(ii) an external archive that is not part of the compliance environment; and
(iii) additional data in the data lake, the additional data being obtained not from the compliance archive or the external archive but instead from one or more other sources that are external to the data lake;
wherein a third one of the integration mechanisms provides periodic export of indexing artifacts related to compliance data to the analytic environment; and
wherein the providing and implementing are performed by a processing platform comprising one or more processing devices.

13. The method of claim 12 wherein implementing a plurality of integration mechanisms supporting interaction between the compliance environment and the analytic environment via the data lake further comprises one or more of:
providing direct access from the analytic environment to compliance data in a compliance archive of the compliance environment;
associating event data retained in the compliance archive of the compliance environment with enterprise activity data stored in the data lake for enhancing modeling functionality of the analytic environment;

providing movement of contextual data associated with one or more transactions from the analytic environment to the compliance environment;

scaling at least one of the compliance and analytic environments so as to facilitate coordinated handling of combined workloads including one or more of ingestion, archiving, search, surveillance, and model development and scoring;

rehosting of at least a portion of ingestion functionality of one or more ingestion engines of the compliance environment on one or more ingestion engines of the analytic environment; and providing one or more workflows for the compliance environment based at least in part on one or more models generated by the analytic environment utilizing compliance data obtained from the compliance environment via the data lake.

14. The method of claim 12 further comprising one or more of:

moving event data from one or more ingestion engines of the compliance environment to the data lake for use by the analytic environment;

moving at least one of indexes and indexing artifacts to the data lake for use by the analytics environment;

moving archived files from a compliance archive of the compliance environment to the data lake for use by the analytic environment;

moving contextual data from the data lake to the compliance environment; and obtaining additional data in the data lake for use by both the compliance environment and the analytic environment.

15. An article of manufacture comprising a processor-readable storage medium having one or more software programs embodied therein, wherein the one or more software programs when executed by at least one processing device of a processing platform cause the processing device:

to provide at least portions of a compliance environment and an analytic environment;

to provide at least a portion of a data lake at least partially shared between the compliance environment and the analytic environment; and to implement a plurality of integration mechanisms supporting interaction between the compliance environment and the analytic environment via the data lake;

wherein a first one of the integration mechanisms implements a unified indexing capability across the compliance and analytic environments;

wherein a second one of the integration mechanisms implements tracking of data set interrelationships across the compliance and analytic environments;

wherein the first integration mechanism comprises a unified indexer configured to generate indexes over both content and metadata, the unified indexer being further configured to permit integrated searching over data from:

(i) a compliance archive of the compliance environment;

(ii) an external archive that is not part of the compliance environment; and (iii) additional data in the data lake, the additional data being obtained not from the compliance archive or the external archive but instead from one or more other sources that are external to the data lake; and wherein a third one of the integration mechanisms provides periodic export of indexing artifacts related to compliance data to the analytic environment.

16. The article of manufacture of claim 15 wherein a given one of the integration mechanisms provides direct access from the analytic environment to compliance data in a compliance archive of the compliance environment.

17. The article of manufacture of claim 16 wherein the given integration mechanism comprises functionality configured to permit the data lake to obtain archived files from the compliance archive of the compliance environment.

18. The article of manufacture of claim 15 wherein a given one of the integration mechanisms associates event data retained in a compliance archive of the compliance environment with enterprise activity data stored in the data lake for enhancing modeling functionality of the analytic environment.

* * * * *